Jan. 17, 1956 R. P. DELLNER 2,731,235
SHAFT DRILL RIG

Filed May 7, 1952 9 Sheets-Sheet 1

FIG. 1

INVENTOR.
RAYMOND P. DELLNER
BY
ATTORNEY

Jan. 17, 1956  R. P. DELLNER  2,731,235
SHAFT DRILL RIG

Filed May 7, 1952  9 Sheets-Sheet 2

INVENTOR.
RAYMOND P. DELLNER
BY
ATTORNEY

Jan. 17, 1956  R. P. DELLNER  2,731,235
SHAFT DRILL RIG
Filed May 7, 1952  9 Sheets-Sheet 3

INVENTOR.
RAYMOND P. DELLNER
BY
ATTORNEY

Jan. 17, 1956 R. P. DELLNER 2,731,235
SHAFT DRILL RIG
Filed May 7, 1952 9 Sheets-Sheet 4

INVENTOR.
RAYMOND P. DELLNER
BY
ATTORNEY

Jan. 17, 1956 R. P. DELLNER 2,731,235
SHAFT DRILL RIG
Filed May 7, 1952 9 Sheets-Sheet 5

INVENTOR.
RAYMOND P. DELLNER
BY
ATTORNEY

Jan. 17, 1956  R. P. DELLNER  2,731,235
SHAFT DRILL RIG

Filed May 7, 1952  9 Sheets-Sheet 6

INVENTOR.
RAYMOND P. DELLNER
BY
ATTORNEY

Jan. 17, 1956     R. P. DELLNER     2,731,235
SHAFT DRILL RIG

Filed May 7, 1952     9 Sheets-Sheet 7

INVENTOR.
RAYMOND P DELLNER
BY
ATTORNEY

Jan. 17, 1956  R. P. DELLNER  2,731,235
SHAFT DRILL RIG

Filed May 7, 1952  9 Sheets-Sheet 8

FIG. 14

INVENTOR.
RAYMOND P. DELLNER
BY
*John E. Reufer*
ATTORNEY

Jan. 17, 1956         R. P. DELLNER         2,731,235
SHAFT DRILL RIG
Filed May 7, 1952                           9 Sheets-Sheet 9

INVENTOR.
RAYMOND R DELLNER
BY
ATTORNEY

United States Patent Office 2,731,235
Patented Jan. 17, 1956

1

2,731,235
SHAFT DRILL RIG

Raymond P. Dellner, North Olmstead, Ohio, assignor, by mesne assignments, to Westinghouse Air Brake Company, a corporation of Pennsylvania Application May 7, 1952, Serial No. 286,509

7 Claims. (Cl. 255—51)

This invention relates broadly to rock drilling apparatus, but more particularly to a portable shaft drilling rig.

This apparatus is an improvement of that shown and described in the pending application of Samuel D. Gunning, Serial No. 183,240, filed September 5, 1950, now Patent No. 2,675,996, and assigned to the assignee of the present invention.

The main object of this invention is to produce a drill rig carrying rock drilling apparatus for drilling holes such as are required preparatory to the excavating of vertical shaft, the rig being constructed and arranged in a manner affording simple and efficient adjustment of the drilling apparatus for drilling circular groups of holes of different diameters, the adjustment being possible without materially affecting the height of the drilling apparatus with respect to the ground or surface being drilled, thereby eliminating the necessity of correcting this height after each adjustment by means of a hoisting device such as a crane.

Other objects of this invention will be apparent from the following detailed description, wherein similar characters of reference designate corresponding parts, and wherein.

2

Figure 5:
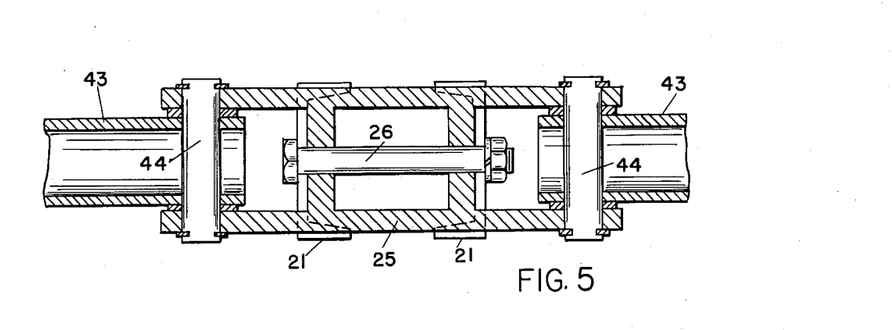
Figure 5 is an enlarged cross sectional view taken on line 5—5 in Figure 1.

Referring to the drawings, the drill rig includes a column-like or upright support 20 preferably made of two parallel channel bars 21 laterally spaced in face to face relationship to accommodate between them the screw member 22 of a jack arrangement, to be described later. The channel bars 21 are rigidly secured to each other at their upper ends by a hanger box 23, including a clevis 24, and at their lower ends by a cross member or base 25 secured to the channels 21 by a cross bolt 26 clearly shown in Figure 5.

Figure 7:
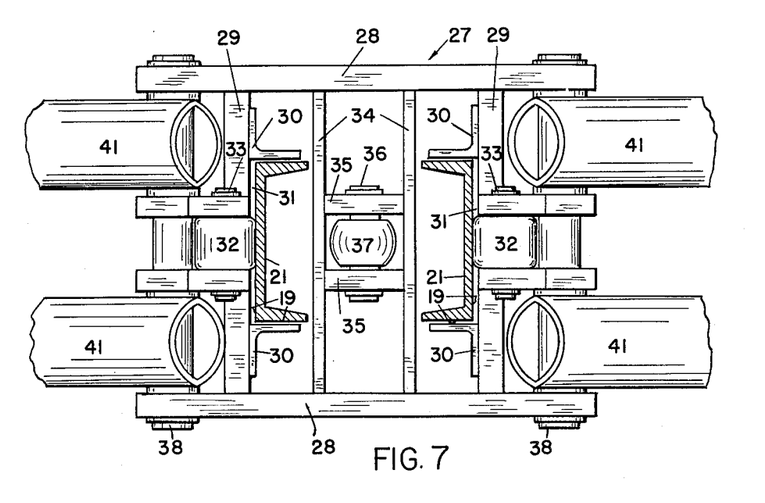
Figure 7 is an enlarged sectional view taken on line 7—7 in Figure 1 and looking in the direction of the arrows.
Figure 8:
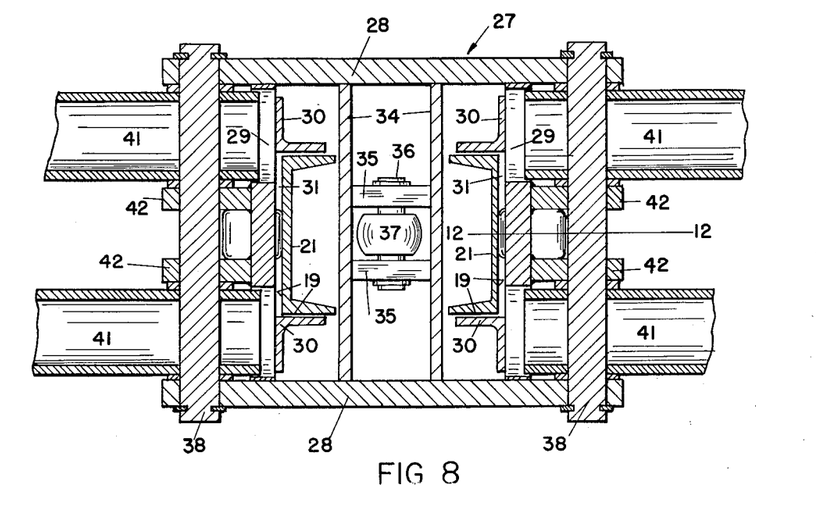
Figure 8 is an enlarged cross sectional view taken on line 8—8 in Figure 1.
Figure 9:
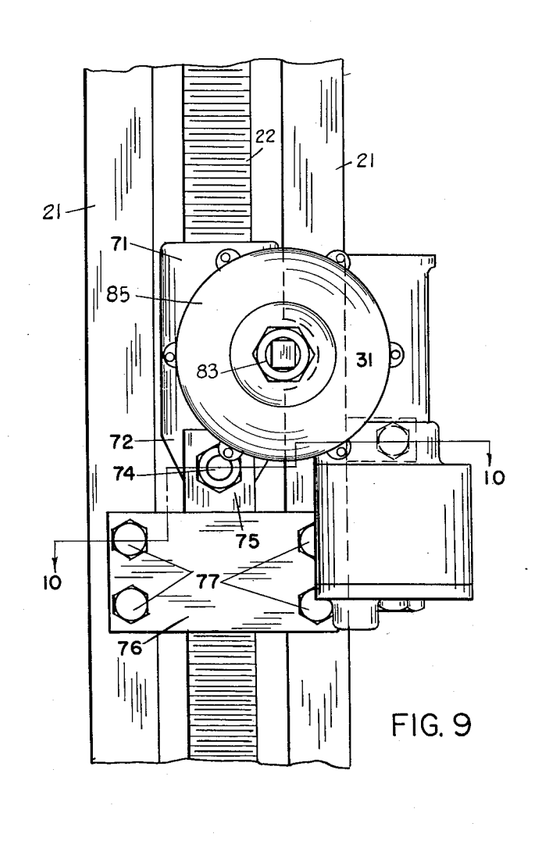
Figure 9 is a side elevational view looking in the direction of the arrows 9—9 in Figure 6.

The outer walls of the channel bars 21 form a pair of parallel longitudinally extending guides 19 diametrically opposed to one another and having slidable thereon a carriage 27, Figures 7 and 8. This carriage is formed of two relatively heavy parallel side plates 28 united by two cross plates 29 welded thereto and located close and parallel to the back of the channels 21. To the inner sides of the cross plates 29 are also welded angle irons 30 forming with the inner sides of the cross plates U-shaped guideways 31 fitting over the guides 19 in slidable engagement therewith to assure guided up and down movement of the carriage 27 on the support 20. Mounted within the upper and lower ends of each guideways 31, there is a roller 32, Figure 12, carried by a cross pin 33 and engageable with the guides 19 to assure free guided movement of the carriage on the support. Parallel to the cross plates 29, are two inner plates 34 welded to the side plates 28 and located between the channels 21. These inner plates are bridged by two smaller plates 35 welded thereto and carrying a cross pin 36 on which is suspended the upper flattened end 37 of the screw member 22, which depends from the carriage 27 centrally between the channels 21. The side plates 28 extend beyond the cross plates 29, and on each side of the support 20 are united by a cross pin 38 located substantially midway the height of the plates, as clearly shown in Figure 12.

Depending from the carriage 27 are two diametrically opposed relatively long diverging supporting legs generally designate by 40 having their upper ends pivotally connected to the carriage by the pins 38. Each leg is made of a pair of laterally spaced relatively heavy tubular members 41 having their upper ends pivotally pinned to the carriage 27 by the pins 38 and maintained in lateral spaced relationship by any adequate means, such as spacers 42 welded to the cross plate 29. Pivotally connected to the base 25 of the support 20 by cross pins 44 are two spreaders or supporting arms 43 which diverge upwardly therefrom, and have their upper ends pivotally pinned approximately midway on each supporting leg 40. The arms 43 which are materially shorter than the legs 40 have their upper ends located between the tubular members 43 where they are pivotally connected by cross pins 45.

Rigidly secured to the lower end of each supporting leg 40 and projecting inwardly and laterally therefrom, there is a support 46 formed of two laterally spaced supporting elements 47 welded at one end to the lower end of the tubular members 41, and at a place intermediate their ends, clamped on a spacing sleeve 48 by a cross bolt 49. The other ends of the supporting elements 47 are formed with two parallel and laterally spaced lugs 50 carrying diametrically opposed trunnions 51 located therebetween and formed by the heads of bolts 52 which extend through the lugs 50. Each supporting element 46 is reinforced by a brace 53 which is welded to the element at a place adjacent its free end and to the corresponding tubular members 41 of the leg 40.

Pivotally mounted on the trunnions 51, there are the laterally spaced lugs 54 of a power unit which includes an air motor 55 and an actuator 56. The actuator is threaded on a screw member 57 which extends upwardly between the lugs 54 and has its lower end pivotally connected, as at 58, to the front end of a drilling apparatus generally designated by 60.

The drilling apparatus includes a relatively long drill guiding frame 61 provided with guides 62 extending the full length thereof in which is free to slide a rock drill 63 carrying a drill steel 64. This drilling apparatus may be of any suitable type well known in this art, and as shown may be equipped with a fluid actuated feeding mechanism including a feed cylinder 65 and a piston rod 66. Feeding motion, that is, longitudinal movement of the rock drill 63 on its frame 61 is transmitted from the feeding mechanism to the rock drill by a flexible cable or chain, not shown. Since this drilling apparatus is well known in this art, no further description is thought necessary, other than pointing out that in the present construction it has an integral, relatively heavy lug 67, extending laterally therefrom at a point located somewhat closer to the lower than the upper ends thereof. This lug extends between the lower ends of the tubular members 41 of the supporting arms 40, where it is pivotally connected by a cross pin 68.

Figure 6:
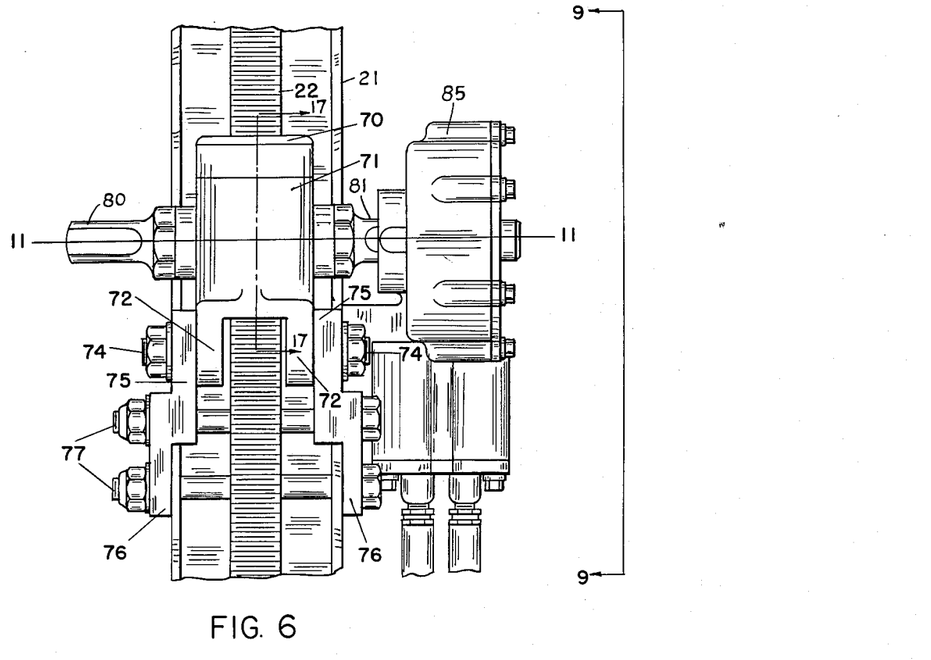
Figure 6 is an enlarged side elevational view looking in the direction of the arrows 6—6 in Figure 1.
Figure 10:
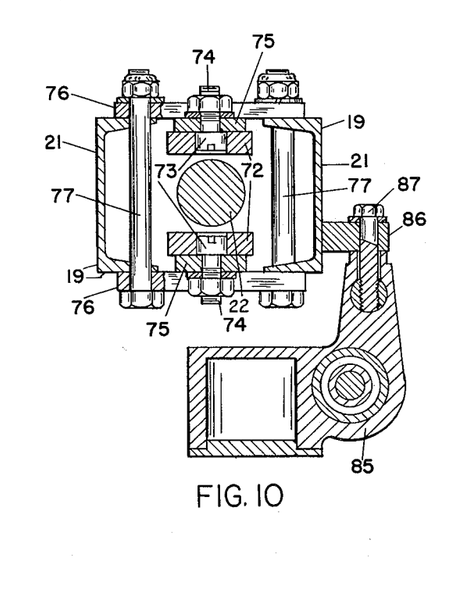
Figure 10 is a cross sectional view taken on line 10—10 in Figure 9 and looking in the direction of the arrows.
Figure 11:
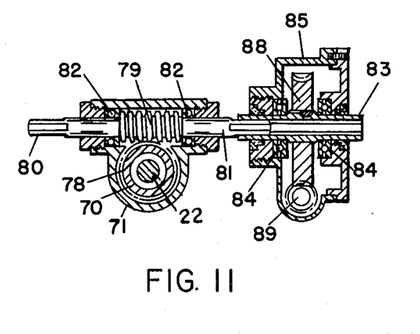
Figure 11 is a reduced cross sectional view taken on line 11—11 in Figure 6.

To effect the slidable movement of the carriage 27 on the support 20, there is provided a self locking jack mechanism comprising an actuator or nut member 70 having the screw or driven member 22 extending therethrough in operative engagement therewith. This actuator is rotatably mounted in a housing 71 where it is held by any suitable means such as a retaining ring 71'. The housing 71 has its lower end in Figure 6 formed by two spaced lugs 72, between which extends the screw member 22. Each lug 72 is mounted on a trunnion 73, Figure 10, formed by the head of a bolt 74 located in the offset portion 75 of a cross plate 76, which plate is rigidly secured to the channels 21 by four cross bolts 77, and thereby also assist in clamping the channels 21 to each other to form the rigid support 20. Exteriorly, the nut member 70 is machined to form a worm gear 78 meshing with a worm 79, Figure 11, mounted transversally thereof in the housing 71 and having its shafted ends 80 and 81 supported in adequate bearings 82 and protruding outside of the housing. The end 80 is formed to receive a crank, not shown, by which the worm may be manually rotated, while the end 81 is drivenly connected to a coaxial shaft 83 rotatably supported in bearings 84 mounted in a housing 85. This last housing is rigidly secured to one of the channels 21 by a welded lug 86 extending laterally from the channel to accommodate a clamping bolt 87. Keyed on the shaft 83, there is a worm gear 88 in mesh with a worm 89 which is drivenly connected to a fluid actuated motor, not shown, housed in housing 85. This motor is preferably of the reversible type, operable the usual way for imparting rotation to the actuator 70 at a greatly reduced speed. Thus, when rotation in either direction is imparted to the actuator 70, it causes the screw member 22 to move longitudinally through the actuator for raising or lowering the carriage 27 on the support 20.

Figure 14:
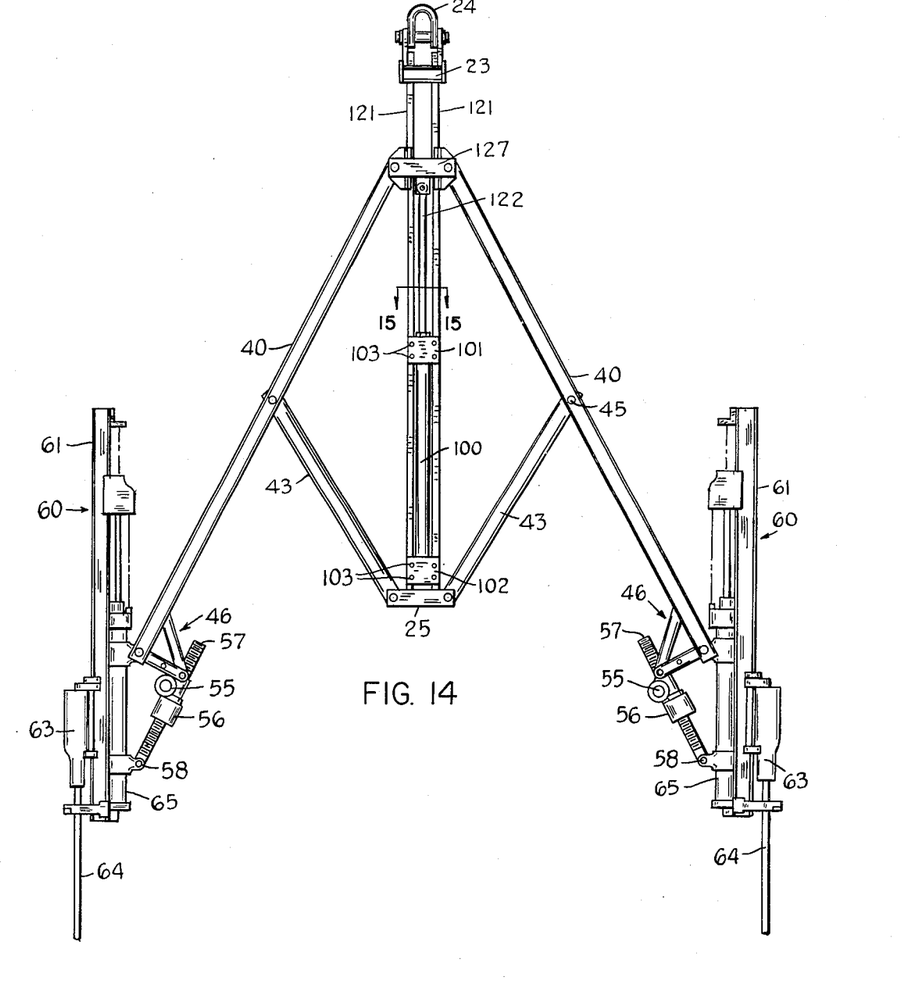
Figure 14 is a portion of a front elevational diagrammatic view of the drill rig embodying a modified construction.
Figure 15:
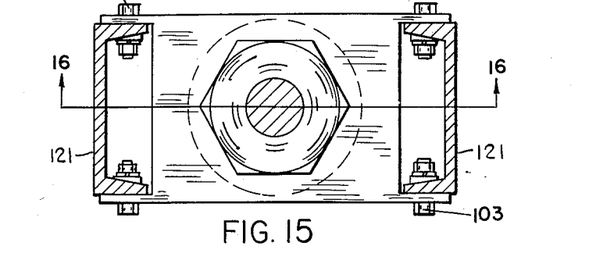
Figure 15 is an enlarged cross sectional view taken on line 15—15 in Figure 14.
Figure 16:
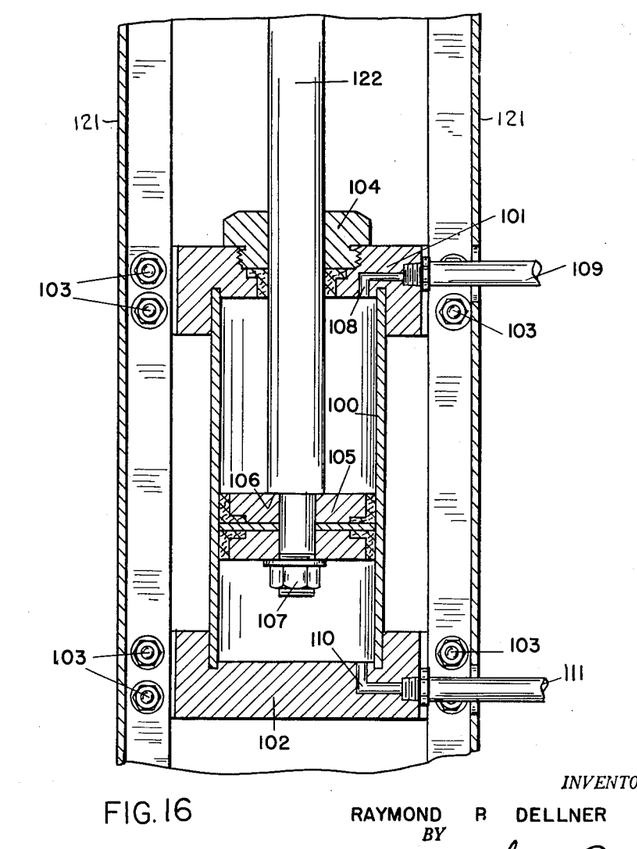
Figure 16 is a longitudinal sectional view taken on line 16—16 in Figure 15.
Figure 17:
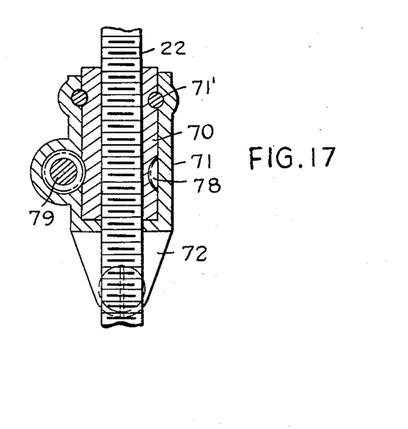
Figure 17 is a longitudinal sectional view taken on line 17—17 in Figure 6.

In the modified construction, the jack mechanism of the screw and nut type above described, has been replaced by one of the cylinder plunger type. As shown in Figures 14 to 16, a piston rod 122 has its upper end pivotally connected to the carriage 127. Mounted between the channel bars 121 and within the lower portion thereof, there is a cylinder 100 closed at its upper end by a cap 101 and at its lower end by a cap 102. Both caps are rigidly secured to the channels 121 by bolts 103. The piston rod 122 extends into the cylinder 100 through a stuffing-box 104 formed in the upper cap 101, and is terminated by a piston head 105 secured against an annular shoulder 106 by a nut 107. Cap 101 is provided with a port 108 opening in the upper end of the cylinder to which may be connected a fluid conveying conduit 109, while the lower cap 102 is provided with a similar port 110 opening in the lower end of the cylinder to which may be connected a conduit 111. Thus it will be understood that when motive fluid is admitted in the cylinder 100 through conduit 109 or 111, it will impart slidable movement to the piston 105 and piston rod 122 for raising or lowering the carriage 127 on the support 120. In this type of jack, it is preferred to operate the piston head 105 hydraulically with the flow of the liquid controlled by suitable valves, through which, after the carriage 127 has been moved to the desired position, liquid is trapped on both sides of the piston 105 to lock it against further movement relative to cylinder 100.

In practice, the entire drilling rig above described, may be raised or lowered with respect to the drilling face of the work such as the bottom of a shaft, by the cable of a hoist or crane hooked to the clevis 24. Once in the desired drilling position, and because vertical adjustment of the rig is not necessary during the drilling of the different groups of holes, the rig may be transferred to a dead hook, that is suspended to a cable or the like having no hoisting means, thereby enabling the hoisting equipment such as a crane to be freed for other work. With the rig or more particularly the support 20 suspended by its upper end or clevis 24, the two drilling apparatus 60 may be set in motion for delivering impacts in rapid succession to the drill steels 64 for drilling holes in the usual way. In shaft drilling it is customary to drill circular groups of holes of different diameters, which may include inner group 90, Figure 2, intermediate group 91 and outer group 92. To that end, the drilling apparatus 60 may be moved to desired position, that is, for instance, from the position shown in dotted lines in Fig. 1 to that shown in full lines, by actuating the jack mechanism of the screw and nut type or of the hydraulic type. With reference to the screw and nut type, rotation imparted to the actuator 70 in one or the other direction will effect longitudinal movement of the cooperating screw threaded or driven member 22 for raising or lowering the carriage 27 on the support 20. Since the supporting legs 40 have their upper ends pinned to the carriage, they will move up and down therewith to cause the lower ends of the legs, by virtue of the pivotal connections 45 with the supporting arms 43, to travel within a substantially horizontal plane. In other words, the vertical movement of the upper ends of the legs 40 is translated into pivotal movement of the lower ends thereof within a horizontal plane or more specifically into horizontal in or out movement of the drilling apparatus 60.

Figure 1:
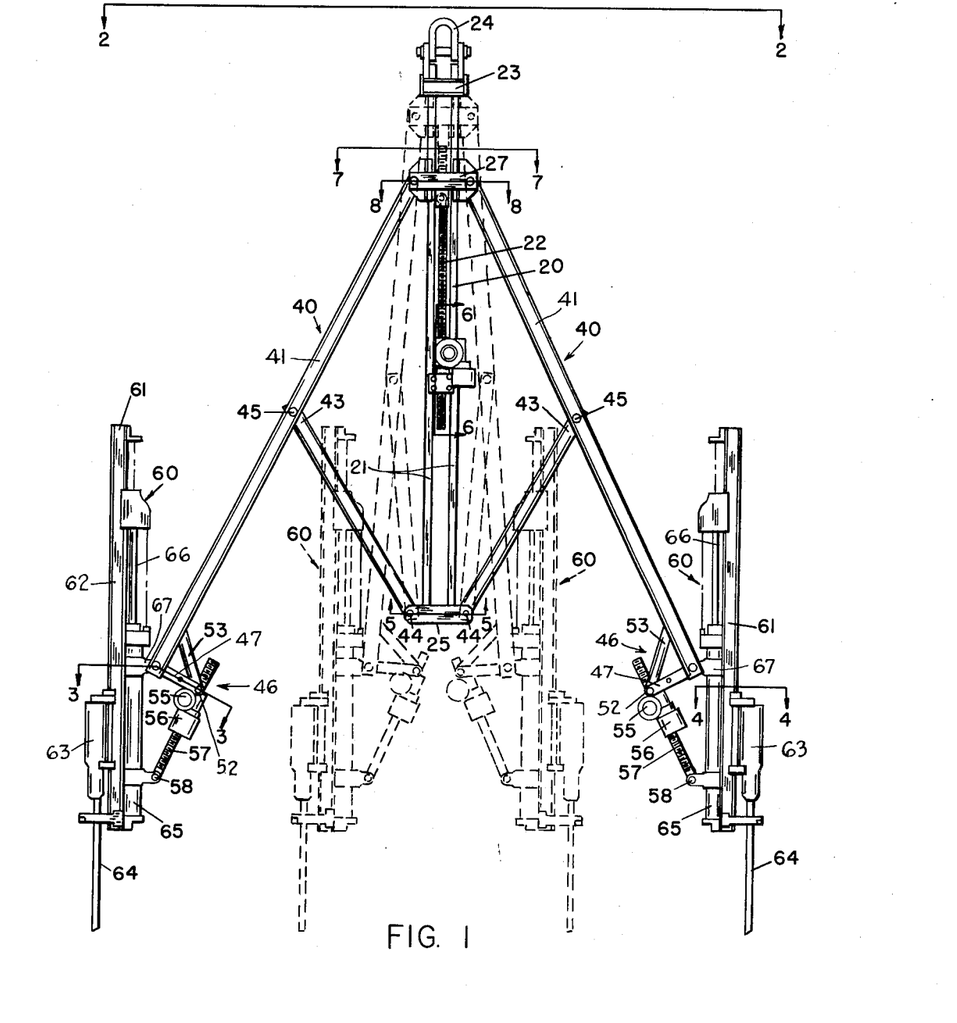
Figure 1 is a front elevational diagrammatic view of the drill rig embodying the invention.
Figure 2:
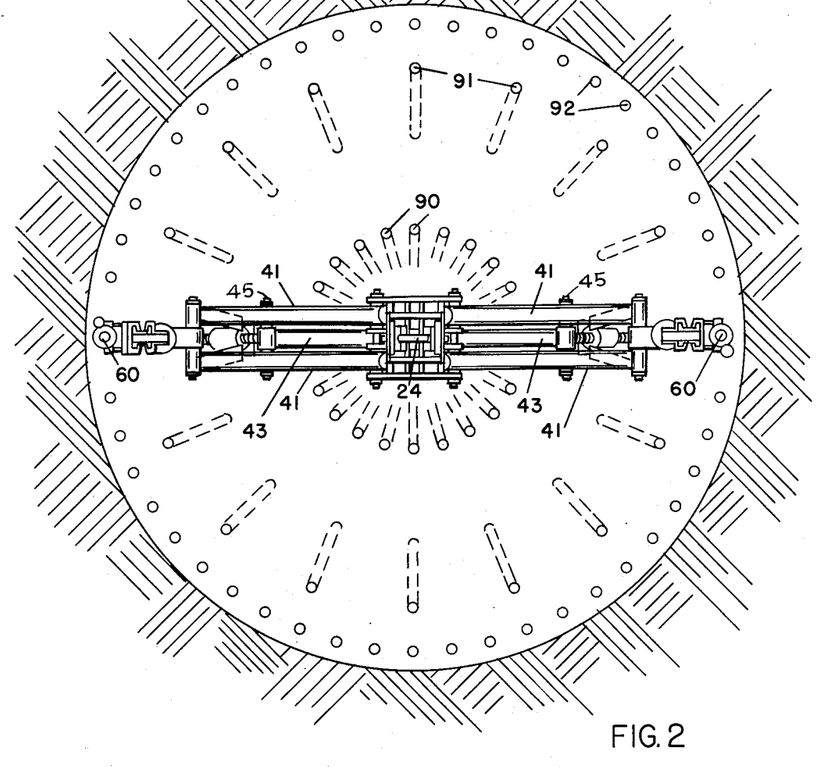
Figure 2 is a top plan view looking in the direction of the arrows 2—2 in Figure 1, showing the drill rig in operative position in a cylindrical shaft being drilled.
Figure 3:
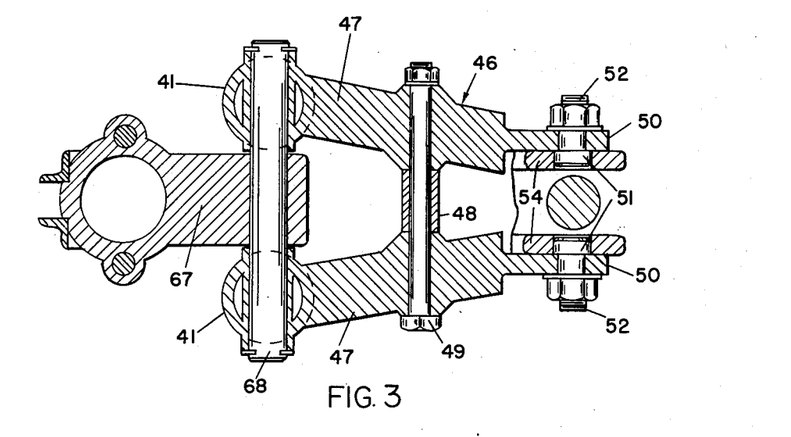
Figure 3 is an enlarged sectional view taken on line 3—3 in Figure 1.
Figure 4:
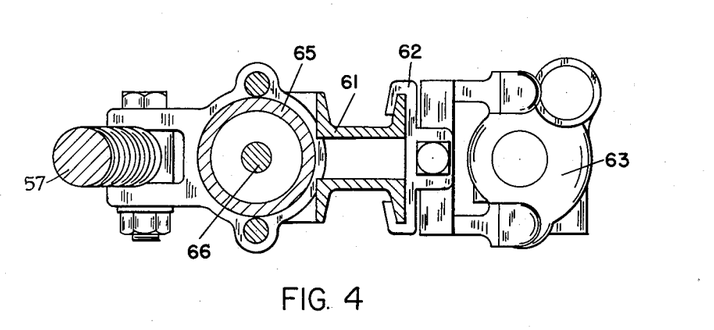
Figure 4 is an enlarged sectional view taken on line 4—4 in Figure 1.
Figures 12, 13:
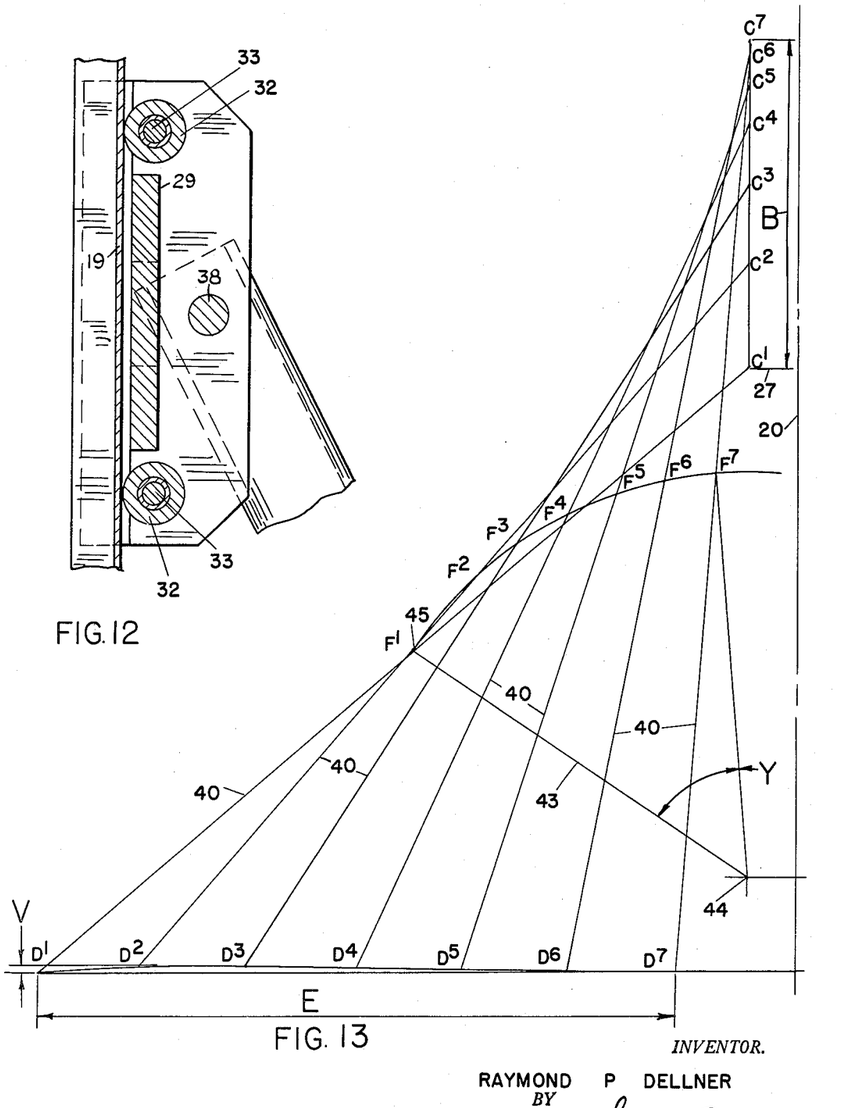
Figure 12 is a cross sectional view taken on line 12—12 in Figure 8.
Figure 13 is a diagram of action of the drill rig.

With reference to Figure 13 which represents a diagrammatic view of the left half portion of the drill rig shown in Figure 1 with several of the elements represented only by straight lines, and wherein B represents the possible travel of the carriage 27 on the support 20; $C^1$ to $C^7$ different positions of the carriage on the support; $D^1$ to $D^7$ corresponding positions of the lower end of the leg 40 within a possible travel or spread E; $F^1$ to $F^7$ corresponding positions of the pivotal connection 45; Y the arc of support and V the variation or extent of departure from the horizontal plane, it will be seen that when the carriage 27 is moved vertically within the possible length of travel B and assumes any position such as $C^1$ to $C^7$, it causes the spreader 43 to move within the possible arc of support Y and its connection 45 with the leg 40 to assume corresponding positions such as $F^1$ to $F^7$. As the result of the vertical movement of the carriage 27 and pivotal movement of the spreader 43, the lower end of the supporting leg 40 is moved horizontally within a possible length of travel E to assume any corresponding positions, such as $D^1$ to $D^7$.

With the several parts bearing the relationship shown in Figure 13, that is, with the spreader 43 pinned midway on the supporting leg 40 and its lower end pinned on the support 20 as at 44, movement of the lower end of the leg 40 and consequently of the drilling apparatus 60 carried thereby is effected within a substantially horizontal plane, the extent of departure from the horizontal being a relatively small variation or pull back indicated in Figure 14 by the distance V. In this instance, it will be noticed that while the plane of movement of the lower end of the leg 40 is at substantially right angles from the plane of movement of its upper end, the possible length of travel E of its lower end is about twice the length of the travel B of its upper end.

In practice, the movement of the two drilling apparatus 60 toward or away from each other in a horizontal plane, is of great importance because all holes such as 90, 91 and 92 can be drilled the same depth without having to compensate for the pull back or variation V, which in drill rigs of this type heretofore was substantially equivalent to the distance B and required the drill rig to be raised or lowered after each adjustment of the drilling apparatus toward or away from each other.

While this feature is generally of great importance, nevertheless it is not necessarily an optimum feature in all shaft drillings. Under different condition, location and ground formation, it may be desirable to provide for movement of the drilling apparatus in either a convex or concave plane rather than a horizontal one, a change which can be effected by changing the length and location of the spreader 43. In other words, from the basic construction above referred to wherein the drilling apparatus are moved within a horizontal plane, it is relatively simple to modify the construction and provide for movement of the drilling apparatus in different planes corresponding or approaching the profile of the most desirable working face.

If it is desired to move the drilling apparatus 60 from the vertical position shown in Figure 1, motive fluid will have to be admitted to the motor 55 for imparting rotation to the actuators 56 in one or the other direction. When the actuators are rotated to move toward the pivotal connections 58, it will cause the inward tilting of the drilling apparatus, and when moved away from the connections 58 it will cause the outward tilting of the drilling apparatus. When the drilling apparatus have reached the desired drilling angle, the supply of the motive fluid to the motors 55 may be shut off, causing the actuators 56 and screw shaft 57, which are self-locking, to maintain the drilling apparatus in the desired position.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A drill rig including a substantially vertical support adapted to be suspended above the ground, a hanger box on the upper end of said support, a carriage mounted on said support for up or down movements thereon, means securing said carriage on said support, means connected to said support and carriage adapted to impart said up or down movements to the carriage, a pair of relatively long rigid legs having their upper ends pivotally connected to said carriage for up and down movement therewith and diverging downwardly therefrom, a drilling apparatus carried by the lower end of each of said legs, and supporting means pivotally pinned to said legs between the ends thereof and to said support causing said lower ends to move horizontally in or out by virtue of the up or down movements of said upper ends.

2. A drill rig including a column-like support adapted to be supported above the ground, suspension means receiving element on said support, a carriage slidably guided on said support for up or down movement thereon, means securing said carriage on the support, a jack mechanism carried by said support below said carriage and operatively associated therewith for imparting said up or down movements thereto, a pair of relatively long rigid legs pivotally connected at their upper ends to said carriage and diverging downwardly therefrom, a drilling apparatus carried by the lower end of each of said legs, and a supporting arm for each of said legs having one end pivotally pinned substantially midway on the leg and the other end on the base of said support.

3. A drill rig including a column-like support adapted to be suspended above the ground, a hanger member on the upper end of said support, a carriage slidably guided on said support for up and down movement thereon within the upper portion thereof means securing said carriage on the support, a self-locking jack mechanism carried by said support below said carriage and operatively associated with the latter for imparting said up or down movements thereto, a pair of relatively long rigid legs pivotally connected at their upper ends to said carriage and diverging downwardly therefrom, a drilling apparatus carried by the lower end of said legs, a pair of supporting arms pivotally connected at their lower ends to the base of said support and diverging upwardly therefrom, and a pivotal connection between the upper ends of said arms and midway of said legs.

4. A drill rig including a column-like support adapted to be suspended above the ground, a hanger member on the upper end of said support, a pair of spaced diametrically opposed parallel guides extending longitudinally of the support, a carriage, means securing said carriage to the support in slidable engagement with said guides for up or down guided movements thereon, a jack mechanism carried by said support including a driven element fastened to the carriage between said guides for imparting said up or down movements thereto, a pair of relatively long rigid legs pivotally connected at their upper ends to said carriage for movement therewith and diverging downwardly therefrom, a drilling apparatus carried by the lower end of each of said legs, a pair of supporting arms pivotally connected at their lower ends to said support and diverging upwardly therefrom, and a pivotal connection between the upper ends of said arms and midway of said legs.

5. A drill rig including an upright support suspended above the ground, a suspension element receiving means on the upper end of said support, guiding means extending longitudinally of said support, a carriage slidably held on said guiding means for up or down guided movements on the support, jack means carried by said support including a driven element fastened to said carriage for imparting said up or down movements thereto, a pair of relatively long rigid legs pivotally connected at their upper ends to said carriage for movement therewith and diverging downwardly therefrom, a drilling apparatus carried by the lower end of each of said legs, a pair of supporting arms pivotally connected at their lower ends to said support and diverging upwardly therefrom, and a pivotal connection between the upper ends of said arms and said legs intermediate the ends thereof.

6. A drill rig normally suspended above the ground comprising a support formed of a pair of substantially vertical laterally spaced and parallel channel bars rigidly affixed to one another, suspension element attaching means on said support, a carriage slidable on said bars for up or down guided movements on the support, means securing said carriage on the support, jack means including a pair of cooperating screw threaded elements, one carried by the support and the other fastened to the carriage between said channel bars, a pair of elongated rigid supporting members pivotally connected at their upper ends to said carriage for movement therewith, said members diverging downwardly from said carriage in diametrically opposed relationship with said support equally spaced therefrom, a drilling apparatus carried by the lower end of each of said supporting members, a pair of supporting arms pivotally connected at their lower ends to said support and diverging upwardly therefrom, and a pivotal connection between the upper ends of said arms and midway of said supporting members.

7. A drill rig including a substantially upright support adapted to be suspended above the ground, a hanger member on the upper end of said support, a carriage vertically movable on said support, means securing said carriage on said support, means connected to said support and carriage adapted to impart said up or down movements to the carriage a pair of relatively long rigid legs pivotally connected at their upper ends to said carriage for vertical movement therewith, said legs diverging downwardly from said carriage, a drilling apparatus carried by the lower end of each of said legs, supporting means pivotally pinned midway on said legs and on the base of said support whereby said lower ends move in a horizontal plane by virtue of the vertical movement of said upper ends, and anti-friction means between said carriage and support rotatably carried by the former for vertical movement therewith on the latter.

References Cited in the file of this patent
UNITED STATES PATENTS

| 1,870,288 | Hayward et al. | Aug. 9, 1932 |
| 2,396,365 | Feucht | Mar. 12, 1946 |

FOREIGN PATENTS

| 13,182 | Great Britain | June 15, 1896 |